July 14, 1964
J. D. BENNETT ETAL
3,141,126
MOTION DETECTION APPARATUS AND METHOD
FOR USE IN BORE HOLE LOGGING
Filed June 4, 1959
2 Sheets-Sheet 1
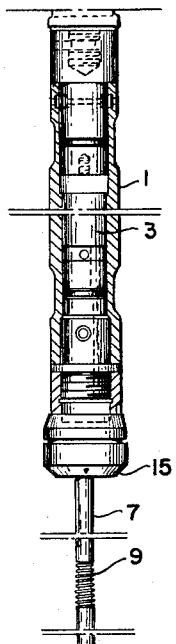
FIG. 1.
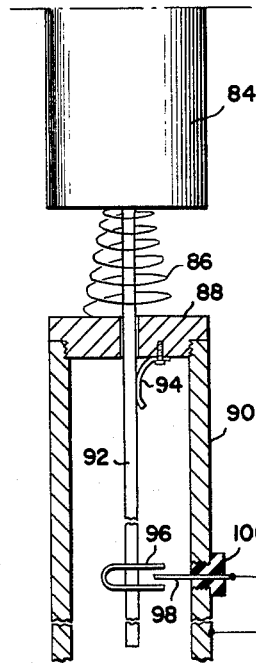
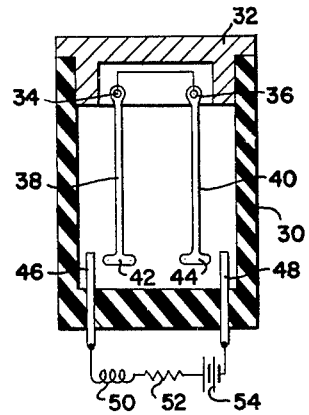
FIG. 4.
FIG. 6.
FIG. 5.
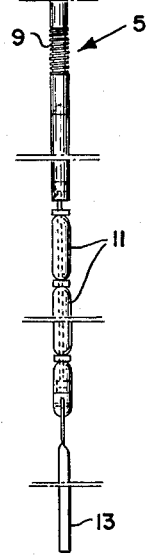
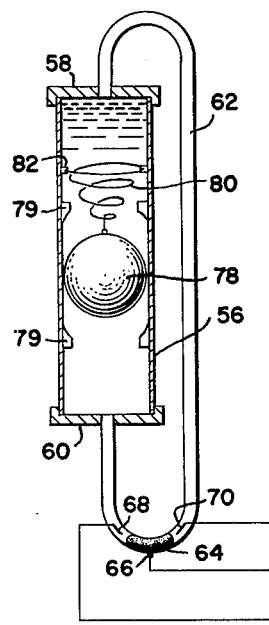
INVENTORS
JOHN D. BENNETT
PRESTON E. CHANEY
BY & FRED M. MAYES
ATTORNEYS July 14, 1964 J. D. BENNETT ETAL 3,141,126
MOTION DETECTION APPARATUS AND METHOD
FOR USE IN BORE HOLE LOGGING
Filed June 4, 1959 2 Sheets-Sheet 2

INVENTORS
JOHN D. BENNETT
PRESTON E. CHANEY
BY & FRED M. MAYES

ATTORNEYS

United States Patent Office 3,141,126
Patented July 14, 1964

3,141,126
MOTION DETECTION APPARATUS AND METHOD FOR USE IN BORE HOLE LOGGING
John D. Bennett, Richardson, Preston E. Chaney, Dallas, and Fred M. Mayes, Richardson, Tex., assignors to Sun Oil Company, Philadelphia, Pa., a corporation of New Jersey
Filed June 4, 1959, Ser. No. 818,163
9 Claims. (Cl. 324—1)

This invention relates to bore hole logging methods and apparatus and particularly to apparatus involving the location of recording means within a hole and to the operation thereof. The invention also relates to special elements for the detection of motion which are especially adapted for use in the logging methods and apparatus.

In the applications of Mayes and Jones, Serial No. 683,027, now Patent No. 3,065,404, filed September 10, 1957, of Bennett, Chaney, Mayes and Jones, Serial No. 685,717, now Patent No. 3,047,794, filed September 23, 1957, of Mayes and Jones, Serial No. 818,066, filed June 4, 1959, and of Bennett, Chaney, Jones and Mayes, Serial No. 818,162, filed June 4, 1959, there are described bore hole logging methods and apparatus which are particularly advantageous in that logging may be accomplished while a drill stem remains in the bore hole to be logged. Apparatus is provided containing recording devices and power supply means associated with electrode or other logging assemblies so that logs may be automatically recorded, for example on magnetic tape, as the electrode or other assembly is caused to move vertically in the hole.

In one type of operation, in accordance with the foregoing applications, when there is a cessation in the drilling operation, the drill stem may be raised from the bottom of the hole and the logging apparatus may then be dropped or lowered through the hollow drill stem with projection of an electrode or other assembly through an opening in the bit to project therebelow, the recording apparatus from which the logging assembly projects coming to rest at a particular position above the bit. In such apparatus the electrode or other logging assembly is desirably flexible so that it may pass through jet openings of the bit, undergoing the necessary deflections to accomplish this result. The bit is raised sufficiently from the bottom of the hole to permit the logging assembly to extend fully within the portion of the hole below the bit.

The logging may then be accomplished independently of electrical connections to the surface by raising the drill stem (or lowering it) to cause the logging assembly to traverse a portion of the hole. In the operation just described the logging apparatus has movements corresponding to those imparted to the bit with respect to which the apparatus occupies a fixed position.

Alternatively, the logging apparatus may comprise an electrode or other logging assembly which is of very considerable length, and in such case the entire logging assembly may be raised or lowered within the stationary drill stem, the electrode or other logging assembly being moved upwardly or downwardly through a bit opening by means of a wire line connection supporting the logging assembly from the surface. This latter procedure may be used particularly when a relatively short length of the bore hole is to be logged.

While in the last mentioned procedure the entire logging operation may be carried out with a continuous movement of the logging assembly, operation in accordance with the first described method will generally involve, for the logging of a considerable length of the bore hole, the necessity for accomplishing the logging in steps, inasmuch as the drill stem cannot be raised continuously throughout the entire logging operation, the raising (or lowering) movement being necessarily interrupted to remove or add drill stem sections.

Especially in the case of accomplishing logging by movements of the drill stem acting as a support for the logging apparatus, but even in the case of movement of the apparatus relative to a fixed drill stem, there arises the problem of correlation of the records with the depths at which they are produced. Theoretically simple, but not too practical, is a system in which a tape or other elongated recording element is advanced at an accurately controlled speed past recording devices such as magnetic recording heads, or in which timing marks are produced on the recording medium at clock-controlled equal intervals. The former of these systems would require rather elaborate electrical controls when batteries are used as power sources because of isolation of the apparatus from a surface, fixed frequency, alternating current supply. The latter requires a clock synchronized with a surface clock. In both systems elaborate records are necessary at the surface giving a record of depth against time, so that, through time correlation, the records may be correlated with the depth at which they are produced.

It is simpler to permit the tape or other recording medium to advance at a speed corresponding to that of a motor which, though desirably designed for reasonably constant speed despite drain on the driving battery as logging proceeds, may have a speed substantially variable over a long period of time. Using a well built and sufficiently powerful motor, it is found justifiable to assume a constant speed throughout any period of drill stem movement between stoppages for removal or addition of drill stem sections. Furthermore, measurements have shown that it is possible to assume validly that the rate of movement of a drill stem during lifting (or lowering) periods is constant. Accordingly, it is possible to use only the logging records, representative of potentials in the case of electrical logging, to correlate the records with depth since absences of changes of the records define those portions made during fixed vertical positions of the drill stem occurring as sections are removed or added. Accordingly, by keeping records at the surface of depths corresponding to cessations of vertical movement of the drill stem and by making the assumption of substantially constant speed of tape advance throughout individual vertical movement periods and of uniform lifting or lowering movements (these assumptions permitting interpolation) complete correlations of records with depth may be secured. Doubts which may sometimes exist as to the precise points on records at which vertical movements began or ended, for example because of variations in the records due to disturbances of the electrodes or other pickup elements caused by mud flow, may generally be resolved by quite valid assumptions that the tape speed was substantially constant throughout several successive periods of vertical movement.

However, it is desirable to provide independent records on the tape or other recording medium of drill stem motions, either rotary or vertical, and it is one object of the present invention to provide devices for making such records of movement. By the use of such records, taken with records of operations performed at the surface, certainty of correlation is readily achieved.

Further objects of the invention relate to the logging methods carried out utilizing records of motion. It may be here noted that the utility of records of motion is not necessarily limited to logging which involves removal or addition of drill stem sections, but such records are also useful when logging movements are imparted to the logging apparatus by means of a wire line connection to the surface, the drill stem being stationary.

The foregoing and other objects of the invention particularly relating to details of the construction and operation will become apparent from the following description, read in conjunction with the accompanying drawings, in which:

FIGURE 1 is a fragmentary and sectional view illustrating, generally, the type of logging apparatus to which the invention is particularly applicable;

FIGURE 4 is a diagrammatic section illustrating another motion detection apparatus;

FIGURE 5 is a sectional and diagrammatic view showing still another motion detecting apparatus; and FIGURE 6 is a sectional and diagrammatic view showing a particularly simple arrangement for the detection of vertical movements.

Figure 3:
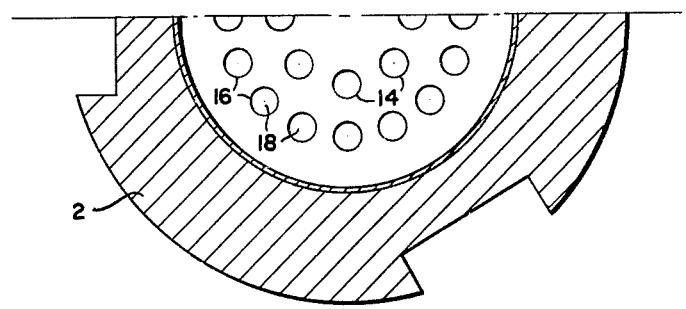
FIGURE 3 is a horizontal section taken on the surface indicated at 3—3 in FIGURE 2.

So far as the present invention is concerned, details of construction and operation of the logging apparatus are subject to wide variation, and accordingly the logging apparatus is merely outlined herein, reference being made to the applications referred to above for desirable details of construction and mode of operation. Referring to FIGURE 1, there is indicated at 1 a protective casing which provides a housing for power-supplying and recording elements of the apparatus, these elements being indicated at 3. While the logging procedure to which the invention pertains may be of various types, for example, electrical, acoustic, radioactive, or the like, the description will be hereafter made on the assumption that electrical logging is being accomplished, involving resistivity and self-potential measurements. In such case, the power and recording apparatus indicated at 3 will comprise power sources such as one or more batteries, recording means, which may be considered as involving a driven magnetic tape on which pulse or other records are made through the use of magnetic recording heads, driving devices for such tape, controlling means for initiating and, if desired, terminating recording, together with amplifying means, etc., such as described in the applications referred to above. An electrode assembly is generally indicated at 5 and is supported from the housing 1. Considering that ordinarily the logging might be most advantageously accomplished by projection of the electrode assembly below a bit by passage through jet openings in the bit, the electrode assembly comprises a flexible multi-conductor cable 7 on the exterior of which at desired locations are the electrodes 9 exposed to the mud within the hole and connected to the recording apparatus through the cable conductors. The assembly may further comprise weighting elements 11 and a flexible tape-like element such as 13 formed of leather or plastic serving to aid in the entry of the electrode assembly into and through a jet opening of a bit due to mud flow. When logging is to be accomplished by supporting the logging apparatus adjacent to the bit, the housing 1 is provided with a lower end 15 adapted to rest on a suitable obstruction or catcher at the lower end of the drill stem in the vicinity of, and above, the bit, this being arranged to provide a good ground to the drill stem for the electrical parts of the recording apparatus. In an arrangement in which the logging is to be accomplished by raising or lowering of the drill stem, the electrode assembly 5 will ordinarily be only of such length as will involve location of the various electrodes sufficiently below the bit to secure the necessary electrical configuration substantially independent of the position of the ground provided by the bit and drill stem. On the other hand, if logging is to be effected by support of the recording apparatus and electrode assembly by a wire line running to the surface, so that the electrode assembly may be moved vertically through bit openings while the drill stem is stationary, the electrode assembly may be of very considerable length, the length corresponding to the range of movement involved in recording the desired length of the hole. In such case, of course, prior to logging the drill stem is raised to bring the bit well above the uppermost level involved in the logging.

The motion detector provided in accordance with the present invention may be of any of various types responsive to different kinds of motions. Lateral vibrations may be detected and are invariably present in movements of a drill stem lengthwise of a hole. Longitudinal accelerations and decelerations appearing respectively when lifting or lowering movements start and stop may also be used to mark the terminations of periods of rest and movement. Rotations may also be detected and are present when the drill stem is spun either to remove or add a new pipe section (though the addition or removal of a section does not necessarily involve rotation of the drill stem since the portion of pipe being added or removed may be rotated with the drill stem stationary).

Figure 2:
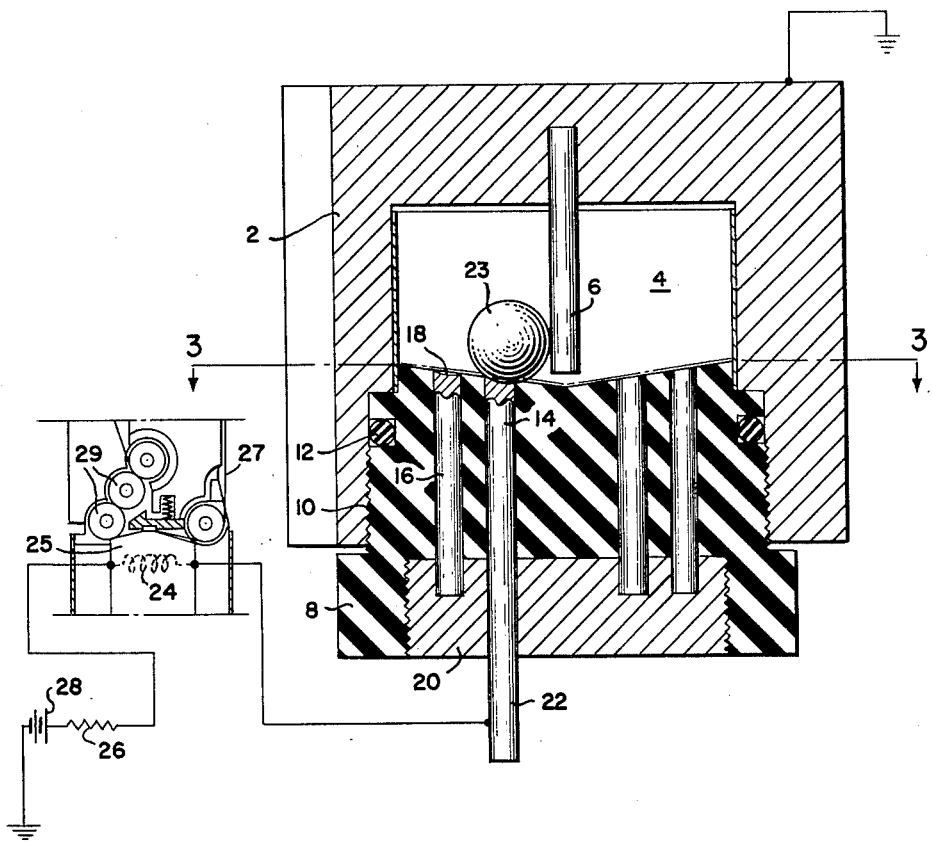
FIGURE 2 is a vertical sectional view of one type of motion detecting device associated with a wiring and mechanical diagram illustrative of its association with recording apparatus.

Various forms of motion detectors will now be described and reference will be first made to that illustrated in FIGURE 2 which serves to give indications of vibrations or rotary movements.

A metal cap member 2 has connected to it a central rod 6 and has its open space exteriorly lined by a good conductor 4, the conductor 4 and rod 6 being desirably of silver as are the other engaging elements of the device. A plug 8 of insulating material is threaded at 10 into the cap with the interposition of an O-ring 12 the purpose of which is to prevent dirt from entering the chamber though it may provide sealing in case a liquid is used in the chamber to provide damping. The plug 8 has circular series of conductive rods 14 and 16 projecting therethrough and exposed at their upper ends where they may be dimpled as indicated at 18 to provide temporary seating for the ball 23 located in the chamber. The rods 14 and 16 are desirably both electrically connected and held in position by solder as indicated at 20. An extension of one of the rods as at 22 may provide one electrical connection, the cap 2 having a ground connection to the housing 3 of the recording apparatus with which it is associated and in which it may be located. The arrangement described is connected in electrical circuit with the recording head coil 24, a current limiting resistor 26 and a battery 28 which may be one of the batteries of the recording unit. The recording head provided with the coil 24 is indicated at 25 and may be one of a series arranged side by side and individually adapted to provide markings on one channel of a multi-channel tape 27 which is advanced by the capstan arrangement 29 as shown in the applications referred to above. The motion records may be made in one channel of the tape, the others being utilized for simultaneously recording logging information. In a preferred arrangement, one channel is used for recording short normal resistivity measurements, another is used for recording long normal resistivity measurements, and a third is used for recording self potentials. In such case a fourth channel records motion. The several signals recorded side by side are correlated with each other by their relative positions across the tape.

In the arrangement just described it will be noted that the plug 8 has a conical upper surface so that unless the angle of inclination of the recording apparatus (and therefore of the drill stem) exceeds a predetermined angle the ball 23 will ordinarily engage the pin 6 and, if the rods 14 are dimpled, will ordinarily complete the circuit through the recording head winding 24 when the apparatus is at rest. If the inclination exceeds the angle corresponding to the cone angle the ball will similarly normally engage the conductive liner 4 and, again, if the rods 16 are dimpled, will normally provide a closed circuit through the recording head coil. Alternatively, if dimples are provided in the insulating material of the plug and the tops of the rods 14 and 16 are continuations of the conical surface of the condition ordinarily achieved will be that of an open circuit.

During vertical movement of the drill stem or during rotation thereof there will be markings provided on the tape indicative of these motions, the markings in the case of vertical movements being due to the attendant lateral vibrations which occur due to bouncing of the drill bit against the irregularities in the walls of the hole. In brief, the record produced in operation using the arrangement of FIGURE 2 will consist of irregular pulses continuing throughout a period of vertical movement, with absences of pulses during periods when the drill stem is stationary. Whenever the drill stem is rotated for making or breaking joints irregular pulses will also be recorded and by their overall duration will be easily identified with such periods of rotation. The result is, of course, to provide depth markers when at the surface there are noted the depths at which sequential movements of different types of the drill stem occur.

FIGURE 4 illustrates an arrangement of a motion detector which is essentially a centrifugal switch, responding, at least primarily, only to rotation of the drill stem. It comprises an insulated cup 30 provided with a conducting cap 32 to which are pivoted at 34 and 36 about parallel axes on opposite sides of the upright axis the pendulums 38 and 40 which are provided with lower bobs 42 and 44 arranged to engage pins 46 and 48 as the pendulums are thrown outwardly by centrifugal action during rotation. The pendulums are connected at their pivots and the pins 46 and 48 are connected in the circuit indicated, comprising the recording head winding 50, a current limiting resistor 52 and a battery 54. In the use of this arrangement the circuit will be completed during spin of the drill stem, whereas there is a considerable improbability that vibrations will provide simultaneous contacts at both pins 46 and 48 during any vibrations which may occur. At any rate, even if such simultaneous contacts do occur due to vibration, the short pulses which would then be recorded may be readily distinguished from the more extended contacts produced during rotation.

The recording of vertical accelerations offers some problem in view of the fact that the accelerations are low, a hoisting engine reaching its governor speed in a period of about one second. Response, therefore, of low frequency type is desired. FIGURE 5 shows an arrangement which is capable of responding properly to the accelerations and decelerations of the drill stem in a vertical direction. A tube 56 is provided with upper and lower caps 58 and 60 between which there extends the manometer tube 62 communicating with a liquid such as water within the tube 56. In the lower bend of the manometer tube is a globule of mercury 64 which under ordinary movements constantly engages a contact 66 while lying between and spaced from a pair of contacts 68 and 70 which are connected together. Between the contact 66 and the pair of contacts 68 and 70 there is the circuit comprising the series arrangement of the recorder winding 72, current limiting resistor 74 and battery 76. So long as the mercury globule is in the position illustrated this circuit is open, or at any rate involves a high series resistance if the liquid flanking the mercury is of relatively high resistance type. A weight, shown in the form of a ball 78, is arranged to slide vertically within the tube 56 and has relatively small clearance with the wall of the tube so that its displacement even at a low rate will force liquid either upwardly or downwardly in the tube 56 and accordingly displace the mercury globule 64 to close the external circuit, the arrangement returning to equillibrium only relatively slowly as liquid flows past the weight or ball 78 under the small head provided by displacement of the mercury globule. Movements of the weight 78 are limited by stops 79. The weight is supported by a spring 80 having a low spring constant and preferably provided as follows:

The spring 80, anchored at 82 as shown is in compression, this situation resulting from the fact that the spring, if the weight were removed, would have its small end above its point of anchorage, being so loaded by the weight that, in effect, when the weight is added it is turned "inside out." The conical helix forming the spring permits such an arrangement with the result that the spring has a very low stiffness and nevertheless may support a considerable weight. The system, therefore, has a very long natural period. It will now be evident that due to the very low spring stiffness and considerable mass provided by the weight 78 even a very low value of acceleration will produce contact at the mercury globule closing the circuit, the weight 78 approaching a condition in which it might be said to be practically stationary as the housing, i.e., the drill stem, is vertically moved.

In a system such as that described, one of the major difficulties is achieving any particular rest position of a weight such as 78. This becomes unnecessary in the arrangement just described by reason of the fact that if due to temperature or other changes the rest position of the weight 78 might vary quite considerably equilibrium will be established, in the sense of separation of the mercury globule 64 from both contacts 68 and 70, despite the rest position of the weight because of the possibility of slow leakage of the liquid past the latter.

A similar situation may be achieved using a mechanical arrangement such as shown in FIGURE 6. Here a weight 84 providing an oscillatable mass is supported by a weak spring 86 (which, if desired, may be provided by an inverted spring in compression as previously described), the spring being supported on the top 88 of a frame or housing arrangement 90, there being guided through the top 88 a square or other non-circular rod 92 secured to the weight and having an electrical contact provided thereto by a spring wiper 94. A spring clip 96 is non-rotatably supported by the rod 92, which itself is non-rotatable in the top 88, and embraces a contact rod 98 mounted in an insulating plug 100 and arranged in series with the recording head winding 102, the current limiting resistor 104 and a battery 106, the return being to the housing or frame 90 and thence through the rod 92 to the clip. The contact rod 98 is rigid and as the weight 84 moves upwardly or downwardly the clip 96 is arrested and the rod 92 may slide therethrough, the result being that the clip 96 has a floating position on the rod 92 always enbracing the contact 98. It will be evident that so long as acceleration is occurring the circuit will become closed by engagement of clip 96 with rod 98. But when the acceleration ceases either by virtue of the drill stem's coming to rest or achieving uniform velocity, vibrations of the weight and spring system will occur, damped by friction, so that utilimately under the conditions of no acceleration there will be an opening of the electrical circuit. The pattern of records produced will clearly indicate the beginning of either positive or negative acceleration.

It will be evident from the foregoing that while the particular characteristics of motion records produced by the several detectors described may be different, the fundamental information as to the history of movement will be recorded and since this can be correlated with records made at the surface, there will be complete correlation of the logging records with depth, utilizing for interpolation during short logging periods the valid assumptions that over short periods the tape is advanced uniformly and the raising or lowering of the drill stem will be uniform.

While it will be evident from the foregoing that the major utility of a motion detector in the arrangement described is in connection with logging carried out by movements of a drill stem, similar information is of value even if logging is effected by movement of a self-contained logging apparatus by means of a wire line and therefore out of the realm of having signal communication with the surface, this being true whether the recorder is operated in an open hole or by passage of an electrode or similar assembly through a bit opening while the bit is stationary. In fact, to secure good marking points for correlation it may be desirable to interrupt momentarily the raising and lowering of such a recording apparatus supported by a wire line, thereby producing vertical accelerations or cessations of vibrations which will provide identifiable records, assumptions being again made that tape drive rate is substantially constant through short intervals between stoppages of movement and that the raising or lowering of the apparatus is uniform. There is thus complete avoidance of the complication of either accurately controlling the speed of the tape or providing clock controlled timing markings thereon. Eliminated also is the necessity for complete time-depth records made at the surface.

From the foregoing it will be obvious that various changes in details of construction and operation may be varied without departure from the aspects of the invention defined in the following claims.

What is claimed is:

1. Apparatus for bore hole logging comprising means movable along a bore hole providing signals variable with local conditions of the strata penetrated by the hole, recording means vertically movable with the first mentioned means, receiving said signals and providing a record thereof, acceleration-sensitive means movable with the first mentioned means providing signals indicative of the occurrence of acceleration movements of the first mentioned means, said first mentioned means, said recording means and said acceleration-sensitive means being connected together for conjoint movement, and means transmitting the last mentioned signals to said recording means, said recording means recording the last mentioned signals to correlate them with the records of the first mentioned signals.

2. Apparatus for bore hole logging comprising means movable along a bore hole providing signals variable with local conditions of the strata penetrated by the hole, recording means vertically movable with the first mentioned means, receiving said signals and providing a record thereof, acceleration-sensitive means movable with the first mentioned means providing signals indicative of the occurrence of vibrational movements of the first mentioned means, said first mentioned means, said recording means and said acceleration-sensitive means being connected together for conjoint movement, and means transmitting the last mentioned signals to said recording means, said recording means recording the last mentioned signals to correlate them with the records of the first mentioned signals.

3. Apparatus for bore hole logging comprising means movable along a bore hole providing signals variable with local conditions of the strata penetrated by the hole, recording means vertically movable with the first mentioned means, receiving said signals and providing a record thereof, acceleration-sensitive means movable with the first mentioned means providing signals indicative of the occurrence of rotary movements of the first mentioned means, said first mentioned means, said recording means and said acceleration-sensitive means being connected together for conjoint movement, and means transmitting the last mentioned signals to said recording means, said recording means recording the last mentioned signals to correlate them with the records of the first mentioned signals.

4. Apparatus for bore hole logging comprising means movable along a bore hole providing signals variable with local conditions of the strata penetrated by the hole, recording means vertically movable with the first mentioned means, receiving said signals and providing a record thereof, acceleration-sensitive means movable with the first mentioned means providing signals indicative of the occurrence of vertical acceleration movements of the first mentioned means, said first mentioned means, said recording means and said acceleration-sensitive means being connected together for conjoint movement, and means transmitting the last mentioned signals to said recording means, said recording means recording the last mentioned signals to correlate them with the records of the first mentioned signals.

5. Apparatus for bore hole logging comprising means movable along a bore hole providing signals variable with local conditions of the strata penetrated by the hole, recording means vertically movable with the first mentioned means, receiving said signals and providing a record thereof, acceleration-sensitive means movable with the first mentioned means providing signals indicative of the occurrence of movements of the first mentioned means, and means transmitting the last mentioned signals to said recording means, said recording means recording the last mentioned signals to correlate them with the records of the first mentioned signals, said first mentioned means and said recording means being connected together for simultaneous movements, said recording means being arranged for location in a predetermined position within a drill stem above a bit, and said first mentioned means being arranged to project through an opening in the bit and extend therebelow to be moved along the bore hole by longitudinal movements of the drill stem.

6. A method of bore hole logging comprising effecting downward movement through a drill stem carrying a bit of means providing signals variable with local conditions of the strata penetrated by the hole, means providing signals indicative of the occurrence of movements of the first mentioned means, and recording means, effecting projection of the first mentioned means through an opening in the bit and location therebelow, producing lengthwise movements of the drill stem along the bore hole, intermittently interrupting said lengthwise movements of the drill stem so that the number of drill stem sections comprising said stem can be varied, and effecting simultaneous recording by said recording means of both of said signals during said movements.

7. A method of bore hole logging comprising effecting downward movement through a drill stem carrying a bit of means providing signals variable with local conditions of the strata penetrated by the hole, means providing signals indicative of the occurrence of movements of the first mentioned means, and recording means, effecting projection of the first mentioned means through an opening in the bit and location therebelow, producing lengthwise movements of the drill stem along the bore hole, intermittently interrupting said lengthwise movements of the drill stem so that the number of drill stem sections comprising the stem can be varied, and effecting simultaneous recording by said recording means of both of said signals during said movements and of at least the first mentioned signals during said interruptions of movements.

8. An accelerometer comprising a reference element, a body having substantial inertia, a spring connected at opposite ends to said reference element and said body so as to support said body for movement relative to said reference element throughout an extended range of rest positions, said spring and body comprising a freely vibrating system wherein acceleration of said reference element, and the inertia of said body produce relative movement between said body and said reference element, means responsive to small relative movements between said body and reference element for producing a signal indicative of the occurrence of such relative movement, said small relative movements being within and of substantially lesser magnitude than the magnitude of said extended range, and lost motion means connected between said body and said signal producing means for permitting movement of said body throughout said extended range of rest positions.

9. The accelerometer as claimed in claim 8 wherein said lost motion means comprises a fluid system for transmitting said relative movements of said body to said signal producing means.

References Cited in the file of this patent

UNITED STATES PATENTS

| | | |
|---|---|---|
| 1,611,749 | Himmelman | Dec. 21, 1926 |
| 1,845,848 | Richards | Feb. 16, 1932 |
| 1,905,200 | Williams | Apr. 25, 1933 |
| 2,302,670 | Buchanan | Nov. 24, 1942 |
| 2,424,390 | Ferris | July 22, 1947 |
| 2,623,805 | Sewell | Dec. 30, 1952 |
| 2,733,310 | Tratsch | Jan. 31, 1956 |
| 2,764,020 | Gadd | Sept. 25, 1956 |
| 2,835,759 | Waldow | May 20, 1958 |
| 2,867,699 | King | Jan. 6, 1959 |
| 2,875,863 | Prather | Mar. 3, 1959 |
| 2,881,276 | Mintz et al. | Apr. 7, 1959 |
| 2,949,783 | Butler | Aug. 23, 1960 |
| 2,955,470 | Comuntzis | Oct. 11, 1960 |